(12) United States Patent
Lee

(10) Patent No.: US 7,634,731 B2
(45) Date of Patent: Dec. 15, 2009

(54) SYSTEM AND METHOD FOR REMOTELY CONTROLLING CHARACTER AVATAR IMAGE USING MOBILE PHONE

(75) Inventor: Hae Pyoung Lee, Pyongtaek (KR)

(73) Assignee: LG Electronics Inc., Seoul (KR)

( * ) Notice: Subject to any disclaimer, the term of this patent is extended or adjusted under 35 U.S.C. 154(b) by 744 days.

(21) Appl. No.: 10/714,926

(22) Filed: Nov. 18, 2003

(65) Prior Publication Data
US 2004/0097221 A1 May 20, 2004

(30) Foreign Application Priority Data
Nov. 20, 2002 (KR) ............ 10-2002-0072472

(51) Int. Cl.
G06F 3/048 (2006.01)
G06F 3/00 (2006.01)
G06F 3/14 (2006.01)
G06F 17/00 (2006.01)

(52) U.S. Cl. ............... 715/706; 715/740; 715/864; 455/566; 463/42

(58) Field of Classification Search ......... 715/726, 715/706, 866, 864, 740, 751, 757, 848; 463/42; 345/638; 455/566; 703/11
See application file for complete search history.

(56) References Cited

U.S. PATENT DOCUMENTS

| | | | |
|---|---|---|---|
| 6,169,555 B1 * | 1/2001 | Yamamoto | 345/473 |
| 6,191,798 B1 * | 2/2001 | Handelman et al. | 345/473 |
| 6,253,167 B1 * | 6/2001 | Matsuda et al. | 703/11 |
| 6,539,240 B1 * | 3/2003 | Watanabe | 455/566 |
| 6,820,112 B1 * | 11/2004 | Matsuda et al. | 709/203 |
| 6,884,172 B1 * | 4/2005 | Lloyd et al. | 463/42 |
| 2002/0028655 A1 * | 3/2002 | Rosener et al. | 455/16 |
| 2004/0030596 A1 * | 2/2004 | Attar et al. | 705/14 |

FOREIGN PATENT DOCUMENTS

| | | |
|---|---|---|
| CN | 1304514 | 7/2001 |
| JP | 2000-59857 | 2/2000 |
| JP | 2000-059857 | 2/2000 |
| JP | 2000-25435 | 9/2000 |
| JP | 2001-156930 | 6/2001 |
| WO | WO 0063874 A1 * | 10/2000 |
| WO | WO 02/27567 | 4/2002 |

OTHER PUBLICATIONS

Korean Office Action dated Oct. 10, 2008.
Japanese Office Action dated Nov. 10, 2008 (and English language translation).
English language translation of Chinese Office Action dated Apr. 24, 2009.

* cited by examiner

Primary Examiner—William L Bashore
Assistant Examiner—Andrew Tank
(74) Attorney, Agent, or Firm—KED & Associates, LLP

(57) ABSTRACT

A system and a method can remotely control an avatar image using a mobile phone. A calling party can remotely control an avatar image included in data transmitted to a called party using a mobile phone. Preferred embodiments of systems and methods according to the present invention can include joint-key button controllers that make buttons corresponding to joints of an avatar image remotely control movements of the joints, respectively. Accordingly, an avatar image received by a called party can be respectively controlled. Since the calling party can remotely control the avatar image transmitted to the called party, it is possible to deliver emotions and messages of the calling party through movements of a visual avatar image.

39 Claims, 5 Drawing Sheets

SYSTEM AND METHOD FOR REMOTELY CONTROLLING CHARACTER AVATAR IMAGE USING MOBILE PHONE

BACKGROUND OF THE INVENTION

1. Field of the Invention

The present invention relates to a communication system and a method, and more specifically to a system and a method for an avatar image.

2. Background of the Related Art

Mobile phones were used mainly for the purpose of a voice communication, but recently, a function of delivering character messages using short message services (SMS) has been added. A short message service (SMS) is a service of delivering texts as contents, which a calling party wants to transmit to a called party.

In the short message service, a message as texts is mainly prepared using consonants and vowels of Korean alphabets (Hangeul) or English alphabets, but specific avatar images such as a heart shape, a face shape, etc., which cannot be expressed using texts, have been included in the message.

As described above, the related art SMS methods and apparatus have various disadvantages. For example, since such images are expressed as still avatar images, not moving avatar images, there is a problem that various images cannot be expressed in various ways.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a system and method for controlling avatar images that solves in a whole or in part problems and disadvantages of the related art.

Another object of the present invention is to provide a telecommunication system and a method for remotely controlling an avatar image using a terminal such as a mobile phone.

Another object of the present invention is to provide a system and a method for remotely controlling an avatar image, wherein a calling party can remotely control an avatar image included in data received by a called party using a calling party phone to provide a moving avatar image.

In order to accomplish at least the above objects and advantages in a whole or in part, the present invention provides a method of controlling an avatar image using a mobile phone that includes correlating input buttons of the mobile phone to joints of the avatar image, respectively, to control movements of the joints.

To further achieve at least the above objects and advantages in a whole or in part, the present invention provides a method of remotely controlling an avatar image transmitted to a called party using a mobile phone that includes receiving an avatar image number at a mobile phone of a called party for identifying an avatar image from a calling party and controlling movements of the identified avatar image in a display screen of the mobile phone of the called party in accordance with data transmitted from the calling party.

A special number configured to identify an avatar image may be a specific service number supplied from an exchanger, or an identifier number specified between a calling party and a called party. It is preferable that a specific service number supplied from the exchanger has a number of at least one cipher, and an identifier number specified between the calling party and the called party has a number of at least one cipher. It is also preferable that the data transmitted to the called party corresponding to an avatar image includes a plurality of groups of numbers including numbers corresponding to the joints of the avatar image, numbers corresponding to up-and-down movements of the joints and a number corresponding to completion of joint movements, and the plurality of groups or actions may be subsequently combined to display a continuous movement of the avatar image.

To further achieve at least the above objects and advantages in a whole or in part, the present invention provides a system that includes a calling party configured to control movements of an avatar image, a called party configured to receive the movements of the avatar image from the calling party and display the received movements of the avatar image and a network configured to connect the calling party to the called party.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A human shape(s) will be described as an avatar image in the following description of preferred embodiments. However, the present invention is not intended to be so limited. For example, avatar images that can be controlled using key buttons of a mobile phone, such as various robots, joints of animals and plants, animal's countenances, etc. are all intended to be included in a scope of embodiments of the present invention.

Figure 1:
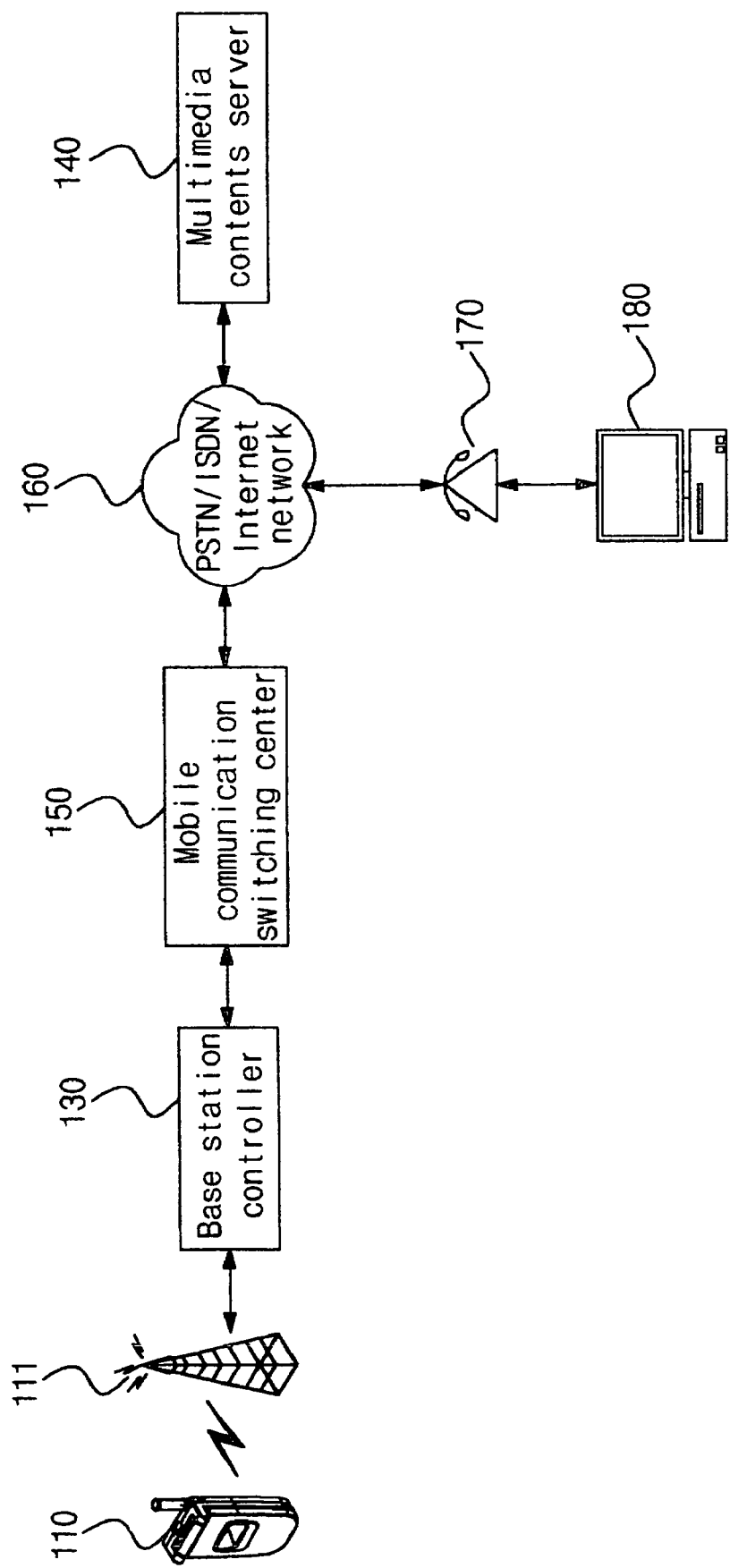
FIG. 1 is a schematic diagram illustrating a preferred embodiment of a mobile communication system configured to transmit/receive an avatar image according to the present invention.

FIG. 1 is a schematic diagram illustrating operation of an embodiment of a mobile communication system configured to remotely control an avatar image according to the present invention. In a mobile communication system as shown in FIG. 1, a usual line phone 170 can be coupled to a computer 180 or a multimedia contents server 140 through an Internet or a private internet network 160. The computer 180 can have code files to be transmitted to a mobile phone 110, and the code files can be divided and compressed in a predetermined size.

The mobile communication system can include a mobile communication switching center 150 coupled to a public switched telephone network (PSTN)/an integrated services digital network (ISDN) 160 for direct connection to a computer 180, and a base station controller 130 coupled to the mobile communication switching center 150. A base station 111 is coupled to the base station controller 130, and a mobile phone 110 is coupled to the base station 111 through a wireless link or the like.

The base station 111 preferably serves for converting signal formats to be suitable for a wireless link and a wire link between the mobile phone 110 and the mobile communication switching center 150, and measures a transmitting/receiving electric field strength (e.g., signal intensity) of the mobile phone 110 to transmit it to the mobile communication switching center 150.

The base station controller 130 is preferably used to couple the respective functions of elements in the base station 111 and cell operators. The base station controller 130 can perform functions such as operational management of a plurality of base stations, management of service conditions of hardware and software in the base stations, assignment and construction of resources with respect to call traffics, establishment of information on operation of the base stations, operation and monitoring of the base stations, monitoring of sub-equipments associated with failure, etc.

The mobile communication switching center 150 preferably provides a line switching service to the base station controller 130 and the mobile phone 110, and performs a channel handoff as an additional function. The multimedia contents server 140 preferably stores multimedia contents in a database, provides to the mobile phone 110 avatar image contents, still images and moving images requested by the mobile phone 110 (e.g., calling/called party). In the mobile communication system described above, a user of a mobile phone can call or receive a call using the mobile phone 110 when coupled to any one base station 111 of base stations in the system.

Figure 2:
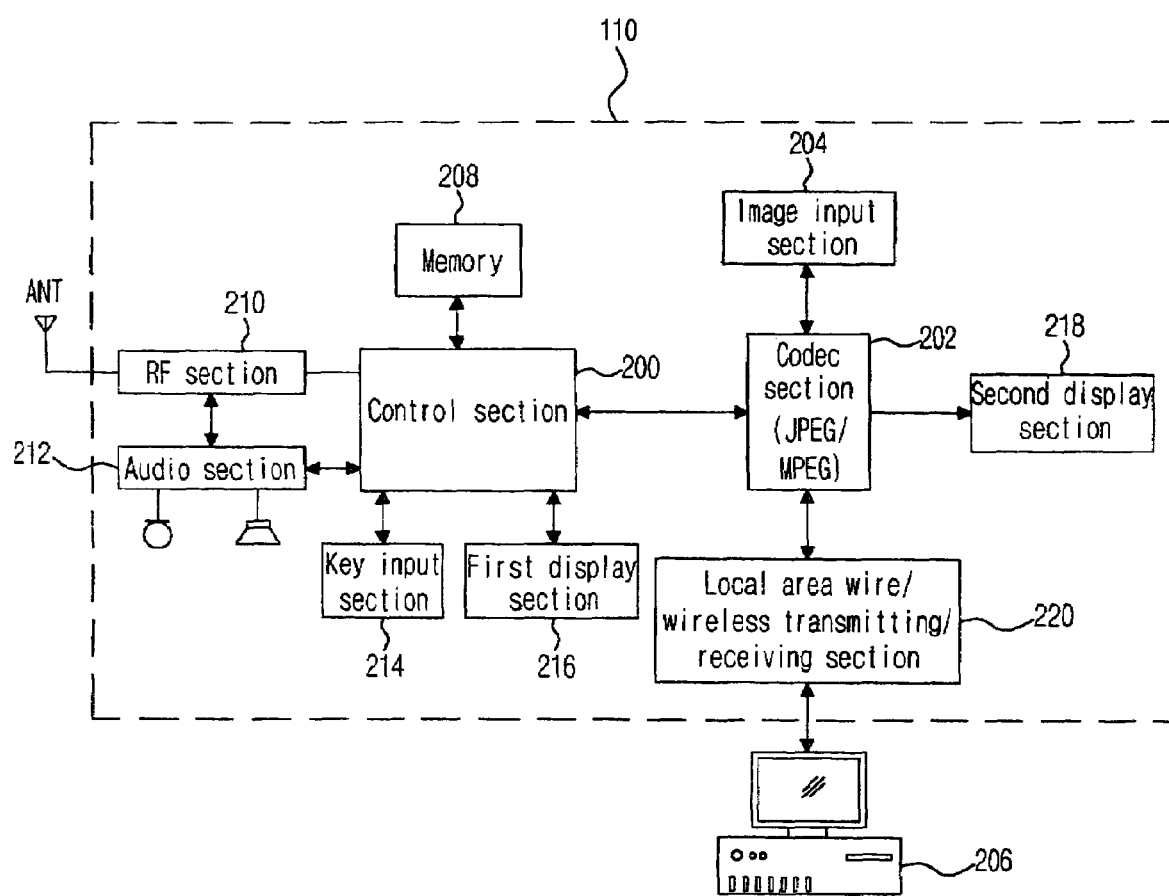
FIG. 2 is a block diagram illustrating a preferred embodiment of a mobile phone capable of providing a communication service for an avatar image according to the present invention.

FIG. 2 is a block diagram illustrating an embodiment of a mobile phone capable of providing a communication service for an avatar image (e.g., remotely controlling) according to the present invention. As shown in FIG. 2, a control section 200 can control whole operations of a mobile phone such as the mobile phone 110 including remote control of an avatar image according to embodiments of the present invention, voice communication and multimedia services.

When a remote control mode of avatar image is requested from a user to realize the remote control of avatar image, the control section 200 preferably controls the codec section 202 to decompress and decode a remote controlled avatar image, a still image or an image communication data transmitted from an external network. In addition, the control section 200 can control the codec section 202 to encode the still image or the image communication data input from an image input section 204, to compress it in a predetermined format of JPEG/MPEG, and to transmit it to an external network or an external computer 206.

A memory 208 can store a predetermined program for remotely controlling the avatar image and whole operations of the mobile phone. The memory 208 can also store (e.g., in a predetermined area), data input and output when the control section 200 performs operation of remotely controlling the avatar image and operations of the mobile phone.

An RF (Radio Frequency) section 210 generally includes a high frequency processing unit, a middle frequency processing unit, and a base band processing unit. That is, the RF section 210 preferably processes the remote controlled avatar image, the still image or the image communication data transmitted from the external network voices and various multimedia data received through an antenna ANT from the external network first at a frequency band for wireless communication, and then performs a middle frequency processing of lowering the frequency band and a processing of converting it into a frequency band to be processed by the control section 200. Further, the RF section 210 can modulate the remote controlled avatar image, the still image or the image communication data input from the image input section 204 and encoded and compressed by the codec section 202 into signals for wireless communication band, to wirelessly transmit it to the external network.

The control section 200 can control an audio section 212 to modulate voice signals input from a microphone MIC into wireless signals, and demodulate wireless signals received through the RF section 210 to send them as voice signals to a speaker SPK. The audio section 212 can also demodulate wireless audio signals included in the remote controlled avatar image, the still image or an image communication data sent from the RF section 210 in an image communication mode, and reproduce and output them through the speaker SPK.

A key input section 214 can include a plurality of number keys and a plurality of functional keys including an avatar image mode key or the like for setting a mode of the remote control of avatar image in the mobile phone. The key input section 214 can generate the corresponding key data when a key is pressed, to output it to the control section 200.

A first display section 216 can be a sub LCD Liquid Crystal Display) provided outside of the mobile phone 110 and has an LCD for displaying various information segments of the mobile phone in a usual communication mode. The first display section 216 can display the key data generated from the key input section 214 and various information signals from the control section 200. A second display section 218 is a main LCD, and preferably colorfully displays the remote controlled avatar image, the still image or the image communication data received from the external network, and the remote controlled avatar image, the still image or the image communication data input from the external computer 206 through a local area wire/wireless transmitting/receiving section 220, in the remote control mode of avatar image.

According to embodiments of the present invention, the remote controlled avatar image may be displayed in the first display section 216, displayed in the second display section 218, or concurrently displayed in the first display section 216 and the second display section 218.

An image input section 204 can be used for a bidirectional image communication service, and receives users' appearances in the image communication mode or the calling party's various appearances in the still image communication as the image communication data to send it to the codec section 202.

The codec section 202 can convert the picked-up image signals provided from the image input section 204 into JPEG or MPEG formats or the like in accordance with control of the control section 200, and compress them at a predetermined rate. Further, the codec section 202 can decompress and decode the compressed image of the remote controlled avatar image, the still image or the image communication data wirelessly received from the external network to send them to the second display section 218.

The remote controlled avatar image, the still image or the image communication data wirelessly received from the external network may be the remote controlled avatar image, the still image or the image communication data transmitted from the other party, and may be various avatar images and VOD (Video On Demand) data provided from web servers coupled to the mobile communication switching center 150 or a plurality of multimedia contents servers 140 or the like.

The local area wire/wireless transmitting/receiving section 220 preferably wirelessly sends various remote controlled avatar images, still images or image communication data in the mobile phone to the external computer 206 through wireless network, or wirelessly receives the remote controlled avatar images, still images or image communication data in the external computer 206 to transmit them to the codec section 202 of the mobile phone. The mobile phone according to embodiments of the present invention is coupled to the external computer 206 through the local area wire/wireless transmitting/receiving section 220 to transmit and receive the remote controlled avatar images, the still images or the image communication data. The local area wire/wireless transmitting/receiving section 220 can include various local area wire/wireless communication methods, in addition to IrDA (Infrared Data Association), Bluetooth, wireless LAN, RS-232, USB, etc.

Figure 3:
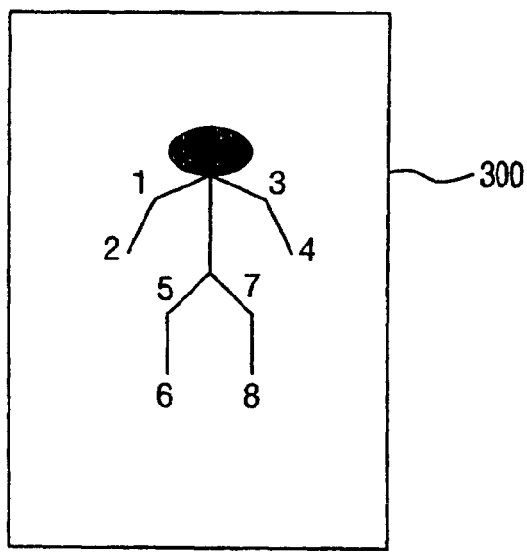
FIG. 3 is a diagram illustrating a model of an avatar image to be expressed in a mobile phone according to a first preferred embodiment of the present invention.

FIG. 3 is a diagram illustrating a model of an avatar image to be expressed in a mobile phone according to a first embodiment of the present invention. The model of the avatar image 300 shown in FIG. 3 can be stored (e.g., equally) in both of the calling mobile phone 110 and the called mobile phone 110, and the calling mobile phone can remotely control the avatar image displayed in the called mobile phone, so that emotions and messages of the calling party can be delivered to the called party through visual avatar images and avatar movements other than voices and short messages.

Preferably, arm joints and leg joints out of the joints of the avatar image 300 are made to correspond to numbers on a key pad of the mobile phone, respectively, to express messages and emotions. However, the present invention is not intended to be so limited as alternate input functions on a phone (e.g., mobile phone) can correspond to various joints or portions of an avatar image.

As shown in FIG. 3, right arm joints of the avatar image 300 can correspond to key buttons 1 and 2 on the key pad, respectively, and left arm joints of the avatar image 300 correspond to key buttons 3 and 4 on the key pad, respectively. Right leg joints of the avatar image 300 can correspond to key buttons 5 and 6 on the key pad, respectively, and left leg joints of the avatar image 300 correspond to key buttons 7 and 8 on the key pad, respectively.

Figure 4:
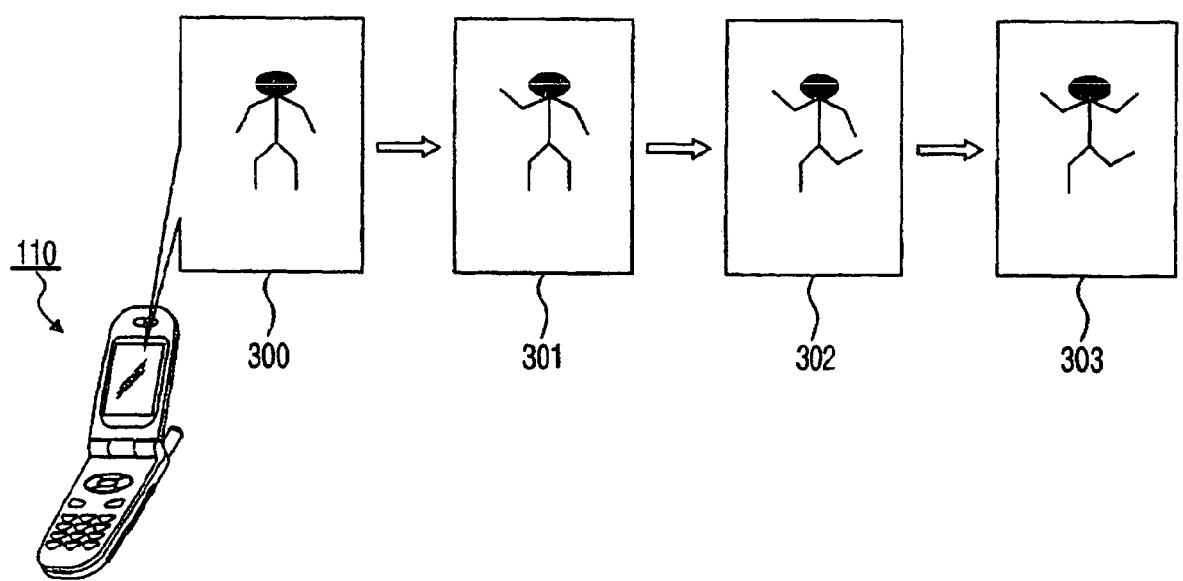
FIG. 4 is a diagram illustrating exemplary movements of the avatar image to be expressed in a mobile phone using manipulation of key buttons of a calling party according to the first preferred embodiment of the present invention.

When the calling party controls the avatar image stored in the called mobile phone, pressing of the key buttons corresponding to the joints of the avatar image 300 on the key pad of the key input section 214 can make the corresponding joints of the avatar image 300 move. FIG. 4 is a diagram that illustrates an exemplary movement of the first embodiment of the avatar image to be continuously expressed in the called mobile phone because of manipulation of key buttons of the calling party according to the present invention.

As shown in FIG. 4, when the calling party wants to control the avatar image 300 of the called party, the calling party presses the key button numbers or the like of his mobile phone while seeing the avatar image 300 in operation displayed in his mobile phone. When the key button number 2 is pressed, the right arm joint of the basic avatar image is raised up (block 301). When the key button numbers 2 and 8 of the calling mobile phone are pressed, the right arm joint and the left leg joint of the basic avatar image 300 are raised up, respectively (block 302). In addition, if the key button numbers 2, 4 and 8 of the calling mobile phone are pressed, the right arm joint, the left arm joint and the left leg joint of the basic avatar image 300 are raised up, respectively (block 303).

Accordingly, if the calling party manipulates the avatar image in his phone screen, the avatar image in a phone screen of the called party is controlled (e.g., equally) in accordance with the calling party's manipulation. Thus, intentions of the calling party can be variously expressed through the avatar image of the called party key button manipulation of the calling party.

Figure 5:
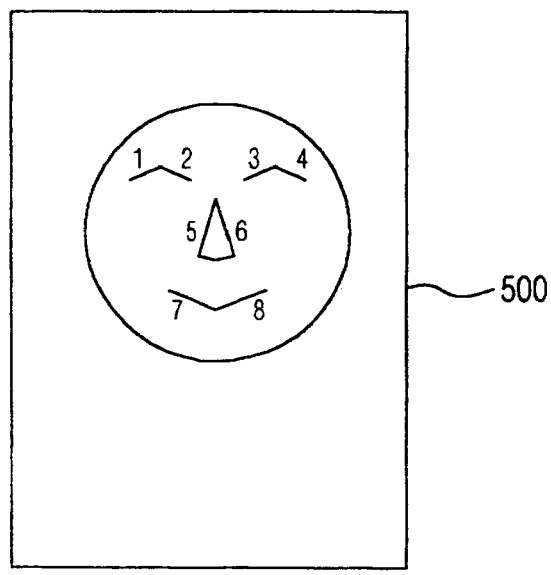
FIG. 5 is a diagram schematically illustrating a face model of an avatar image to be expressed in a mobile phone according to a second preferred embodiment of the present invention.

FIG. 5 is a diagram schematically illustrating a face model of an avatar image to be expressed in a mobile phone according to a second embodiment of the present invention. The model of the avatar face image 500 shown in FIG. 5 can be stored (e.g., equally, color variation) in both of the calling mobile phone 110 and the called mobile phone 110. Preferably, the calling mobile phone can remotely control the avatar image displayed in the called mobile phone, so that emotions and messages of the calling party can be delivered to the called party through visual avatar images other than voices and short messages.

As shown in FIG. 5, joints of both eyes, a nose and a mouth out of various countenances of the avatar face image 500 can be made to correspond to the numbers 1 to 8 or the like on the key pad of a phone (e.g., the mobile phone 110) to express intentions.

A right eye joint of the avatar face image 500 can correspond to the key buttons 1 and 2 on the key pad, and a left eye joint of the avatar face image 500 can correspond to the key buttons 3 and 4 on the key pad, respectively. The nose of the avatar face image 500 can correspond to the key buttons 5 and 6 on the key pad, and the mouth joint of the avatar face image 500 can correspond to the key buttons 7 and 8 on the key pad, respectively. The nose of the avatar face image 500 corresponding to the key buttons 5 and 6 preferably becomes smaller by depression of the key button 5, or larger by depression of the key button 6. However, the present invention is not intended to be so limited.

Figure 6:
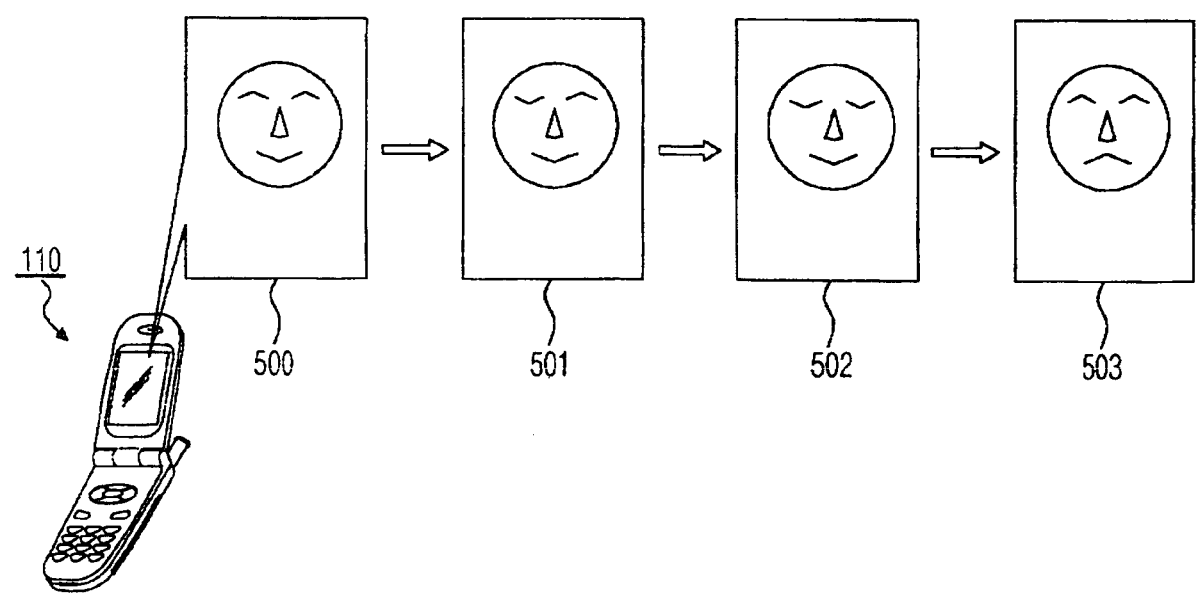
FIG. 6 is a diagram illustrating exemplary movements of the avatar image to be expressed in a mobile phone because of manipulation of key buttons of a calling party according to the second preferred embodiment of the present invention.

When the calling party wants to control the avatar image stored in the called mobile phone, pressing of the key buttons corresponding to the joints of the avatar face image 500 on the key pad of the key input section 214 preferably makes the corresponding joints of the avatar face image 500 move. FIG. 6 is a diagram that illustrates an exemplary movement of the second embodiment of the avatar face image to be continuously expressed in the called mobile phone because of manipulation of key buttons of the calling party according to the present invention.

As shown in FIG. 6, when the calling party wants to control the avatar image of the called party, the calling party presses the key buttons of his mobile phone, preferably while seeing the avatar face image 500 in operation displayed in his mobile phone. For example, when the key buttons 1 and 2 are pressed, the right eye joint of the basic avatar face image 500 is raised up (block 501). When the key buttons 3 and 4 of the calling mobile phone are pressed, the left eye joint of the basic avatar face image 500 is raised up, respectively (block 502). Similarly, if the key buttons 7 and 8 of the calling mobile phone are pressed, the mouth joint of the basic avatar face image 500 are raised up, respectively (block 503).

In this manner, if the calling party manipulates countenances of the avatar image in his phone screen, the countenances of the avatar image in the phone screen of the called party is correspondingly or equally controlled in accordance with the calling party's manipulation. Thus, intentions of the calling party can be variously expressed through the avatar image (e.g., movements) or avatar emotions of the called party by means of key button manipulation of the calling party.

In addition, according to embodiments of the present invention, motions of various avatar models can be variously combined. For example, the first embodiment of the model of an avatar image of FIG. 3 and the second embodiment of the model of an avatar image FIG. 5 can be variously combined. Thus, it is possible to variously express the avatar image.

For example, identifiers for identifying the first embodiment of FIG. 3 and the second embodiment of FIG. 5, respectively, can be set as specific keys. Depending upon input of such specific identifier keys, any one of the first embodiment of FIG. 3 and the second embodiment of FIG. 5 can be executed, or both of the first embodiment of FIG. 3 and the second embodiment of FIG. 5 may be executed simultaneously.

Figure 7:
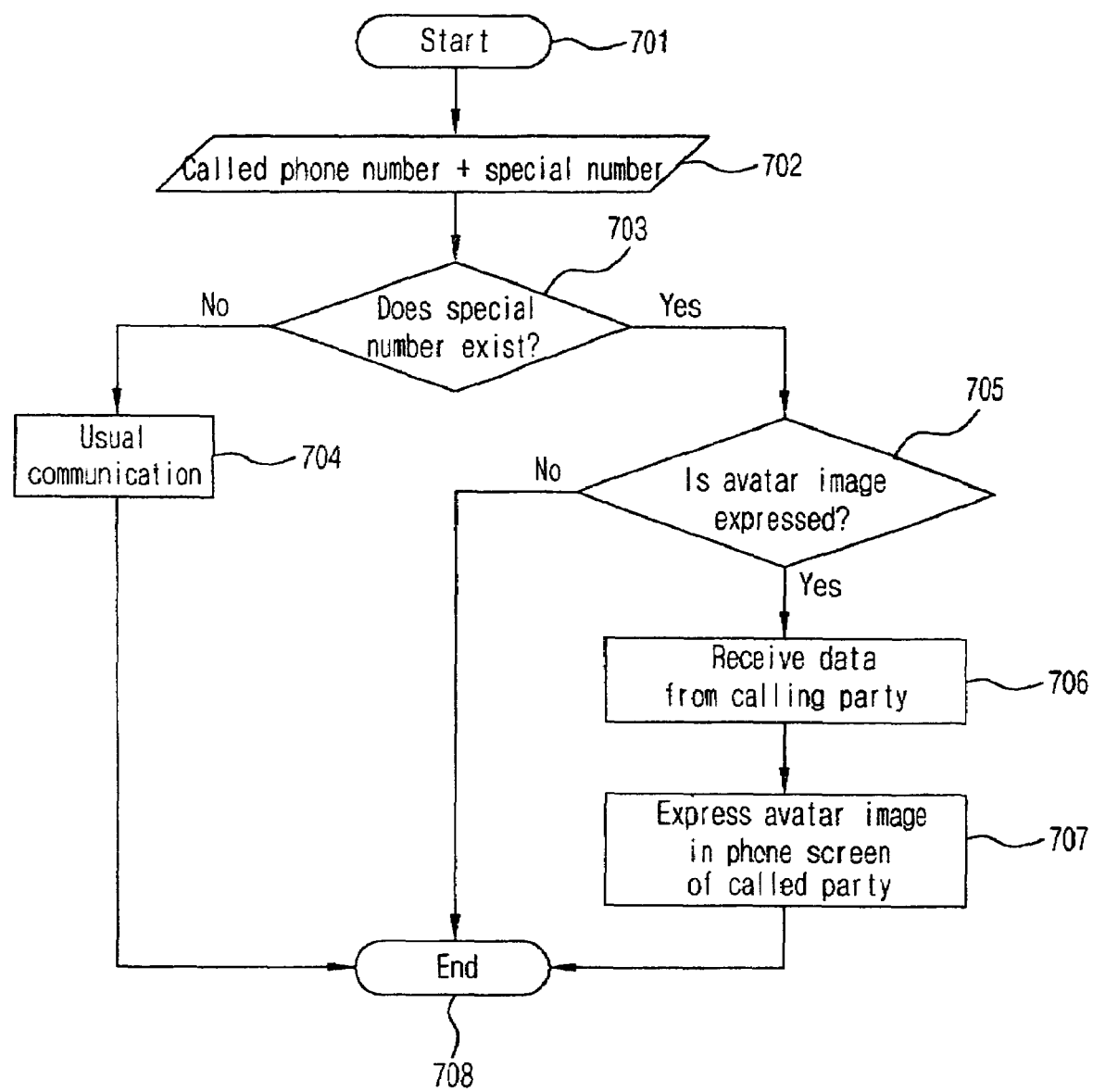
FIG. 7 is a flowchart illustrating a preferred embodiment of a method of controlling an avatar image to be expressed in a terminal according to the present invention.

FIG. 7 is a flowchart illustrating an embodiment of a method of controlling an avatar image according to the present invention. As shown in FIG. 7, when a process for controlling the avatar image of the called party is started by the calling party (block 701), the calling party can press the phone number of the called party and an indicator such as a special number (block 702). From that time when the called party receives the special number from the calling party, the remote control of the avatar image preferably becomes possible.

The special number can be an identifier number or the like for controlling the avatar image, and may have one cipher, two ciphers or more ciphers. However, the present invention is not intended to be so limited.

Alternatively, when the process for controlling the avatar image of the called party is started by the calling party (block 701), the calling party presses the phone number of the called party and another special number (e.g., block 702), and from that time when the called party receives the another special number from the calling party, the remote control of the avatar image becomes possible where the another special number can be a service number.

For example, the another special number may be a service number 300 or a service number 500, similar to the service number 700 provided from Korea Telecom Corporation. In this case, the another special number, for example, the service number 500 is preferably pressed first and then the phone number of the called party is pressed. Thus, the another special number can be another identifier number for controlling the avatar image, and has usually three ciphers.

Since the service number 500 can serve as a special identifier number for controlling the avatar image, an exchanger (e.g., switching center) can assign a data channel, not a voice channel, and request a call setting to the called party. In this way, after undergoing the above course (block 702), the called mobile phone can judge whether the special numbers for identifying the character image are input or not (block 703).

When it is judged that no special number is input (block 703), a usual voice communication is requested (block 704), not the remote control (e.g., transmission) of avatar image. Then, the process is finished (block 708) with the end of the usual communication.

When it is judged that any special number is input (block 703), the control process for remotely controlling the avatar image can be requested. Thus, it is judged whether expression of the avatar image is requested or not (block 705).

When it is judged by the called mobile phone that the expression of the avatar image is not desired (block 705), the process is finished (block 708). However, when it is judged that the expression of the avatar image is desired (block 705), the called mobile phone can receive data for controlling the avatar image from the calling party (block 706), express a predetermined avatar image in the phone screen in accordance with the received data (block 707) and can finish the process after the expression is over (block 708).

When the process for remotely controlling the avatar image is started, initial avatar images (e.g., as shown in FIGS. 3 and 5) can be displayed in the phone screen of the called party. The data for controlling the avatar image from the calling party is preferably data for expressing movements of the avatar image in accordance with press of the key buttons (e.g., as described above with reference to FIGS. 4 and 6).

For example, when the calling party presses first the key button 2 and then the up-and-down buttons (for example, 9), the right arm joint can be raised up and then when the calling party presses the key button (for example, 0) corresponding to end or completion of movements of the joints, such signals are preferably transmitted to the called party to display the avatar image changed by the calling party in the phone screen of the called party. Therefore, in order to successively express the actions (e.g., 301 to 303) as shown in FIG. 4, the key buttons should be pressed in the order of "290, 890 and 490".

Then, the initial image 100 is changed into the second image 301 due to reception of the numbers 2, 9 and 0, is changed into the third image 302 due to reception of the numbers 8, 9 and 0, and is changed into the fourth image 303 due to reception of the numbers 4, 9 and 0. Similarly, the series of operations shown in FIG. 6 (e.g., 501 to 503) can be performed. However, any set of input functions available on the mobile terminal could be used.

As described above, embodiments of a system and method for remotely controlling avatar images according to the present invention have various advantages. For example, embodiments of the present invention, can store the model of the avatar image in both of the calling mobile phone and the called mobile phone, and the calling party can remotely control the avatar image displayed in the called mobile phone while seeing the phone screen of the calling party. Accordingly, emotions and messages of the calling party can be delivered to the called party through visual avatar images (e.g., movements) other than voices and short messages. Therefore, a capability for self expression can be increased.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling an avatar at a called party, the method comprising:

displaying the avatar at a mobile phone of the called party, the avatar including a plurality of joints, each joint of the avatar corresponding to a different key of a mobile phone of a calling party;

receiving signals for controlling a joint of the avatar displayed on the mobile phone of the called party based on at least three inputted ones of the keys of the mobile phone of the calling party, wherein the received signals are transmitted from the mobile phone of the calling party to the mobile phone of the called party, the received signals based on the at least three inputted keys, the at least three inputted keys including a first key corresponding to one joint of the avatar, a second key to cause motion of the one joint of the avatar corresponding to the first key and a third key to end motion of the one joint of the avatar; and controlling the one joint of the displayed avatar in accordance with the received signals.

2. The method of claim 1, wherein the avatar is transmitted from the mobile phone of the calling party over a network.

3. The method of claim 1, further comprising displaying the avatar on the mobile phone of the calling party and controlling the displayed avatar equally at the mobile phone of the calling party and the mobile phone of the called party.

4. The method of claim 1, wherein the signals include an identifier number for identifying the avatar.

5. The method of claim 4, wherein the identifier number has at least one cipher.

6. The method of claim 1, wherein the signals are transmitted via a wired network or a wireless network.

7. The method of claim 1, wherein controlling at least one joint of the displayed avatar includes controlling an expression of the displayed avatar.

8. The method of claim 1, wherein controlling at least one joint of the displayed avatar includes controlling actions of the displayed avatar.

9. The method of claim 1, further comprising:

receiving another signal from the mobile phone of the calling party based on another inputted one of the keys, the received another signal based on the another inputted one of the keys corresponding to another one of the joints of the avatar; and controlling the another joint of the displayed avatar based on the received another signal.

10. An apparatus comprising:

a receiver, at a mobile phone of a called party, for receiving signals for controlling an avatar having a plurality of joints, wherein the signals are transmitted from a mobile phone of a calling party based on at least three inputted keys of a key pad of the mobile phone of the calling party, each joint of the avatar corresponding to a different key of the mobile phone of the calling party, the at least three inputted keys including a first key corresponding to one joint of the avatar, a second key to cause movement of the one joint of the avatar corresponding to the first key and a third key to end movement of the one joint of the avatar;

a display for displaying the avatar at the mobile phone of the called party; and a controller for controlling different states of the displayed avatar at the mobile phone of the called party in accordance with the received signals, wherein the controller controls the different states by controlling the joints of the avatar corresponding to inputted keys of the mobile phone of the calling party.

11. The apparatus of claim 10, wherein the avatar is transmitted from the mobile phone of the calling party over a network.

12. The apparatus of claim 10, wherein the signals include an identifier number for identifying the avatar being controlled.

13. The apparatus of claim 12, wherein the identifier number has at least one cipher.

14. The apparatus of claim 10, wherein the signals are transmitted via a wired network or a wireless network.

15. The apparatus of claim 10, wherein the received signals correspond to input keys from the mobile phone of the calling party.

16. The apparatus of claim 10, wherein the controller controls an expression of the displayed avatar in accordance with the received signals and by controlling at least one joint of the avatar.

17. The apparatus of claim 10, wherein the controller controls actions of the displayed avatar in accordance with the received signals and by controlling at least one joint of the avatar.

18. The apparatus of claim 10, wherein the avatar being controlled at the mobile phone of the called party is the same as in the mobile phone of the calling party.

19. A method of controlling an avatar displayed at a mobile phone of a called party using a mobile phone of a calling party, the method comprising:

displaying the avatar on the mobile phone of the called party and displaying the avatar on the mobile phone of the calling party, wherein the avatar displayed on the mobile phone of the calling party has a plurality of joints, each joint of the avatar displayed on the mobile phone of the calling party corresponding to a different key of the mobile phone of the calling party;

generating signals, based on at least three inputted ones of the keys, for controlling the corresponding one joint of the avatar displayed on the mobile phone of the called party, the at least three inputted keys including a first key corresponding to the one joint of the avatar, a second key to cause movement of the one joint of the avatar corresponding to the first key and a third key to end movement of the one joint of the avatar; and transmitting the signals to the mobile phone of the called party via a network.

20. The method of claim 19, further comprising changing a communication mode to a control mode.

21. The method of claim 19, wherein the avatar is displayed equally at the mobile phone of the calling party and at the mobile phone of the called party.

22. The method of claim 19, wherein the signals include an identifier number for identifying the avatar being controlled.

23. The method of claim 22, wherein the identifier number has at least one cipher.

24. The method of claim 19, wherein the signals are transmitted via a wired network or a wireless network.

25. A mobile phone of a calling party for controlling an avatar displayed at a mobile phone of a called party, the mobile phone comprising:

a display for displaying the avatar at the mobile phone of the calling party;

a key pad having a plurality of keys, each joint of the avatar corresponding to a different key of the mobile phone of the calling party;

a controller for generating signals for controlling the avatar displayed at the mobile phone of the called party based on a selected three of the keys of the key pad and the controller for controlling the avatar displayed at the mobile phone of the calling party by changing a specific joint of the avatar corresponding to a selected key of the mobile phone of the calling party, the selected three keys include a first key corresponding to the specific joint of the avatar, a second key to cause motion of the specific joint of the avatar corresponding to the first key and a third key to end motion of the specific joint of the avatar; and a transmitter for transmitting the signals from the mobile phone of the calling party to the mobile phone of the called party via a network.

26. The mobile phone of claim 25, wherein the avatar is displayed equally at the mobile phone of the calling party and at the mobile phone of the called party.

27. The mobile phone of claim 25, wherein the signals include an identifier number for identifying the avatar being controlled.

28. The mobile phone of claim 27, wherein the identifier number has at least one cipher.

29. The mobile phone of claim 25, wherein the transmitter transmits the signals to the mobile phone of the called party via a wired network or a wireless network.

30. A method of controlling an avatar, the method comprising:
generating signals to control the avatar at a mobile phone of a called party by selecting at least three keys of a mobile phone of a calling party, wherein the avatar
includes a plurality of joints and each joint of the avatar corresponds to a different key of the mobile phone of the calling party, the at least three keys including a first key corresponding to one joint of the avatar, a second key to cause motion of the one joint of the avatar corresponding to the first key and a third key to end motion of the one joint of the avatar;
transmitting the signals via a network;
receiving the signals at the mobile phone of a called party; and
displaying the avatar in different representations at the mobile phone of the called party based on the received signals, wherein each representation includes a different arrangement of at least one joint of the avatar.

31. The method of claim 30, further comprising displaying the avatar in different representations at the mobile phone of the calling party.

32. The communication system of claim 30, wherein the avatar being controlled at the mobile phone of the called party is the same as in the mobile phone of the calling party.

33. A method of controlling an avatar at a mobile phone of a called party, the method comprising:
receiving signals for controlling a joint of the avatar, wherein the received signal is transmitted from a mobile phone of a calling party to the mobile phone of the called party; and
displaying the avatar controlled in accordance with the received signals at the mobile phone of the called party based on selection of at least three keys from the mobile phone of the calling party, the received signals corresponding to both one joint of the avatar and one of the keys of the mobile phone of the calling party, the at least three keys including a first key corresponding to the one joint of the avatar, a second key to cause motion of the one joint of the avatar corresponding to the first key and a third key to end motion of the one joint of the avatar,
wherein the avatar being controlled at the mobile phone of the called party is the same as in the mobile phone of the calling party, wherein the avatar of the mobile phone of the calling party is equally controlled and displayed corresponding to an input signal generated by a user of the mobile phone of the calling party.

34. A method of controlling an avatar at a mobile phone of a called party, the method comprising:
receiving signals for controlling the avatar based on a specific key pad selection of the mobile phone of the calling party, wherein the received signals are transmitted from the mobile phone of the calling party to the mobile phone of the called party, wherein the specific key pad selection includes a first key corresponding to one joint of the avatar, a second key to cause movement of the one joint of the avatar corresponding to the first key and a third key to end movement of the one joint of the avatar;
controlling the avatar in accordance with the received signals; and
displaying the controlled avatar at the mobile phone of the called party,
wherein the avatar being controlled at the mobile phone of the called party is the same as in the mobile phone of the calling party, wherein the avatar of the mobile phone of the calling party is equally controlled and displayed corresponding to the signals generated by a user of the mobile phone of the calling party based on the first key, the second key and the third key.

35. A method of controlling an avatar stored in a mobile phone of a called party using a mobile phone of a calling party, the method comprising:
selecting the avatar being controlled using the mobile phone of the calling party;
generating signals for controlling the selected avatar, wherein the generated signals are based on at least three keys of the mobile phone of the calling party and a corresponding one joint of the avatar, the at least three keys include a first key corresponding to the one joint of the avatar, a second key to cause movement of the one joint of the avatar corresponding to the first key and a third key to end movement of the one joint of the avatar; and
transmitting the signals to the mobile phone of the called party via a network,
wherein the avatar being controlled at the mobile phone of the called party is the same as in the mobile phone of the calling party, wherein the avatar of the mobile phone of the calling party is controlled and displayed corresponding to the generated signals.

36. A method of controlling an avatar stored in a mobile phone of a called party using a mobile phone of a calling party, the method comprising:
selecting the avatar being controlled using the mobile phone of the calling party;
displaying the selected avatar on the mobile phone of the calling party;
generating signals for controlling the displayed avatar, wherein the generated signals are based on at least three inputted keys of the mobile phone of the calling party and a corresponding one joint of the avatar, the at least three inputted keys including a first key corresponding to the one joint of the avatar, a second key to cause motion of the one joint of the avatar corresponding to the first key and a third key to end motion of the one joint of the avatar; and
transmitting the signals to control the displayed avatar to the mobile phone of the called party via a network, wherein the avatar being controlled at the mobile phone of the called party is the same as in the mobile phone of the calling party, wherein the avatar of the mobile phone of the calling party is equally controlled and displayed corresponding to the generated signals.

37. A method of controlling an avatar at a mobile phone of a called party, the method comprising:

receiving, at the mobile phone of the called party, a special number from a mobile phone of a calling party, wherein the special number represents an identified number for controlling the avatar;

displaying the avatar at the mobile phone of the called party, the avatar including a plurality of joints;

receiving signals for controlling the avatar from the mobile phone of the calling party based on at least three input keys of the mobile phone, the received signals corresponding to the at least three input keys of the mobile phone and one of the joints of the avatar, the at least three input keys including a first key corresponding to one joint of the avatar, a second key to cause movement of the one joint of the avatar corresponding to the first key and a third key to end movement of the one joint of the avatar; and controlling the one of the joints of the displayed avatar in accordance with the received signals.

38. A method of controlling an avatar displayed at a mobile phone of a called party using a mobile phone of a calling party, the method comprising:

pressing a phone number of the mobile phone of the called party;

pressing a special number, wherein the special number represents an identifier number for controlling the avatar;

displaying the avatar on a display of the mobile phone of the calling party, wherein the avatar has a plurality of joints;

generating signals for controlling at least one joint of the avatar by pressing at least three of a plurality of key buttons of the mobile phone of the calling party, the at least three keys including a first key corresponding to the at least one joint of the avatar, a second key to cause motion of the at least one joint of the avatar corresponding to the first key and a third key to end motion of the at least one joint of the avatar; and transmitting the signals to the mobile phone of the called party via a network.

39. A mobile phone of a calling party for controlling an avatar displayed at a mobile phone of a called party, the mobile phone of the calling party comprising:

key buttons;

a display for displaying the avatar at the mobile phone of the calling party;

a controller for generating a special signal based on a special number input through the key buttons and for generating a control signal for controlling the avatar displayed at the called party, wherein the special number represents an identifier number for controlling the avatar, and the control signal corresponds to at least three of the key buttons, wherein the avatar includes a plurality of joints and the control signal corresponds to one of the joints of the avatar, the at least three keys including a first key corresponding to the one joint of the avatar, a second key to cause motion of the one joint of the avatar corresponding to the first key and a third key to end motion of the joint of the avatar; and a transmitter for transmitting the special signal and the control signal to the mobile phone of the called party via a network.

* * * * *